C. A. BOREHAM.

VEHICLE SPRING.

APPLICATION FILED MAR. 3, 1914.

Reissued Apr. 7, 1914. 13,711.

WITNESSES:

F. C. Fliedner

G. M. Ball.

INVENTOR,

Charles A. Boreham

BY Francis M. Wright,

ATTORNEY

UNITED STATES PATENT OFFICE.

CHARLES A. BOREHAM, OF COALINGA, CALIFORNIA.

VEHICLE-SPRING.

13,711. Specification of Reissued Letters Patent. Reissued Apr. 7, 1914.

Original No. 1,082,794, dated December 30, 1913, Serial No. 753,226. Application for reissue filed March 3, 1914. Serial No. 822,238.

*To all whom it may concern:*

Be it known that I, CHARLES A. BOREHAM, a citizen of the United States, residing at Coalinga, in the county of Fresno and State of California, have invented new and useful Improvements in Vehicle-Springs, of which the following is a specification.

This invention relates to a laminated leaf-spring construction.

The object of this invention is to provide an elliptical spring of the multi-leaf type, which shall be more durable, cheaper of manufacture, and higher in efficiency than the present form of springs now generally used.

The invention consists of the parts and construction and combination of parts as hereinafter more fully described and claimed, having reference to the accompanying drawings, in which—

Figure 1:
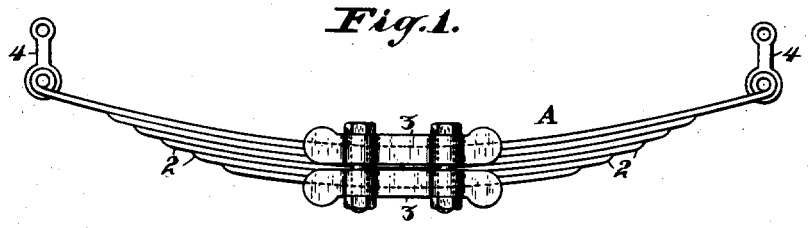
Figure 2:
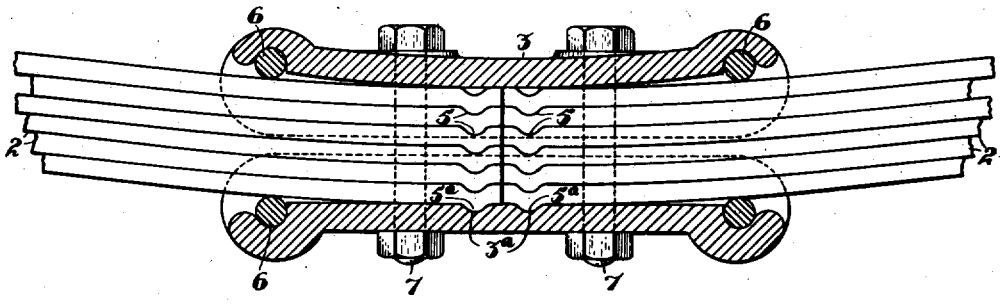
Figure 3:
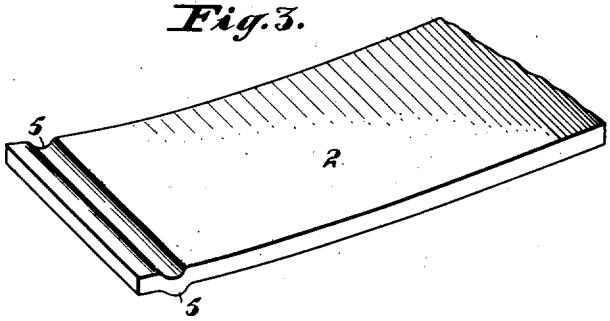

Figure 1 is a side elevation of the spring. Fig. 2 is a section of same, partly broken away. Fig. 3 is a perspective view of the inner end of a leaf-spring, showing the interlocking means.

The purpose of this invention is to provide a multi-leaf spring, which is particularly adapted to use in connection with vehicles. In constructing laminated springs of this type it is very essential that the plates or leaves in the spring should decrease on a regular scale of lengths, in order that the spring may be of equal strength throughout and of sufficient flexibility to yieldingly support the load under all conditions. It happens, however, that the most carefully designed and constructed spring will snap one or more leaves when subjected to more than its maximum compression; thus necessitating the complete renewal of the broken sections.

The main object of the invention is to construct a centrally divided spring, which by its construction will considerably lessen the cost of repair, as it will only be necessary to replace one-half of the broken section.

Referring to the drawings: A indicates in general a spring of the laminated or multi-leaf type, which may be constructed to form any of the well-known varieties such as elliptical, semi-elliptical, scroll, etc. I have here shown the spring A constructed as semi-elliptical, which consists of a segment formed of a number of centrally divided leaves or blades 2, arranged to be attached at the bottom of the axle in the usual manner by a suitable clamp 3, and by the two extremities of the arc, through suitable links or shackles 4 to the body above the axle. The inner ends of the leaves are secured in the clamp 3 and are provided with interlocking grooves or ridges 5 which interlock with each other, for the purpose of further securing the independent leaf sections with relation to each other. The lower ridge $5^a$ is adapted to interlock with a corresponding groove $3^a$ in the lower clamp section, thus providing a positive locking means between the leaf sections and the clamp, independent of the clamping action of same; thus absolutely preventing the removal of any section without first detaching the clamp.

The clamping plates have grooves formed across their outer ends, and rods 6 fit these grooves and bear upon the springs, when the clamping bolts 7 are secured at each side of the springs between the ends and center.

In general practice when removing a broken leaf from the usual leaf-spring, it is invariably found that the leaf is broken either on one side or another of the center; this, however, makes very little difference, as no matter where the leaf is broken it becomes necessary to replace it with a whole new leaf. By constructing a centrally divided leaf-spring, as shown in Fig. 2, it can easily be seen that it will only be necessary to replace a half-leaf in case of breakage, thus materially reducing the repair cost. Furthermore by constructing the several leaves in interlocking half-sections, as shown, greater durability and efficiency may be secured, as much better results may be obtained when tempering the half-leaf section here shown, as compared with the longer section usually employed.

The spring here shown is similar in appearance to the usual form of spring, and takes no more space than same. The material and finish of the several parts are such as experience and judgment of the manufacturer may dictate.

I claim:—

1. A leaf spring of the character described, comprising a series of two-part superposed resilient leaves, the inner ends of the two parts of each leaf being adjacent to each other, and the inner portion of each leaf section having a concavo-convex portion forming on one side a recess and on the other side a projection, said leaves being arranged with said concavo-convex portions interlocking, and means for tightly clamping said leaf-sections together in the above-recited relations.

2. In a leaf spring of the character described, a series of two-part leaves abutting in their meeting ends and having concavo-convex interlocking bends, clamping plates extending in each direction across the meeting ends of the springs, with transverse grooves across their outer ends, cylindrical rods lying in said grooves and bearing upon the springs, and bolts passing through the clamp plates and the springs, said lower clamp plate having grooves engaging the convexities of the two lowermost spring members.

In testimony whereof I have hereunto set my hand in the presence of two subscribing witnesses.

CHARLES A. BOREHAM.

Witnesses:

W. J. KILBY,

A. S. TAYLOR.

Copies of this patent may be obtained for five cents each, by addressing the "Commissioner of Patents, Washington, D. C."